(12) United States Patent
Cosentino et al.

(10) Patent No.: US 10,266,024 B2
(45) Date of Patent: Apr. 23, 2019

(54) HITCH SWITCH ADAPTER CAP WITH WIRELESS CAPABILITIES

(71) Applicants: Vincent Cosentino, Port Jefferson Station, NY (US); Eric Koenig, Huntington, NY (US)

(72) Inventors: Vincent Cosentino, Port Jefferson Station, NY (US); Eric Koenig, Huntington, NY (US)

( * ) Notice: Subject to any disclaimer, the term of this patent is extended or adjusted under 35 U.S.C. 154(b) by 90 days.

(21) Appl. No.: 15/650,842

(22) Filed: Jul. 14, 2017

(65) Prior Publication Data

US 2019/0016185 A1     Jan. 17, 2019

(51) Int. Cl.

| | |
|---|---|
| *B60D 1/62* | (2006.01) |
| *B60D 1/07* | (2006.01) |
| *B60D 1/60* | (2006.01) |
| *B60D 1/26* | (2006.01) |
| *B62D 63/08* | (2006.01) |
| *B60Q 1/00* | (2006.01) |

(52) U.S. Cl.
CPC ............... *B60D 1/62* (2013.01); *B60D 1/075* (2013.01); *B60D 1/26* (2013.01); *B60D 1/60* (2013.01); *B60Q 1/0076* (2013.01); *B62D 63/08* (2013.01)

(58) Field of Classification Search
CPC .. H02J 3/006; H05B 37/0272; H04L 12/2816; G06F 1/325; B60D 1/62; B60D 1/60; B60D 1/26; B60D 1/075; B60L 1/00
USPC ............................................ 700/295; 307/9.1
See application file for complete search history.

(56) References Cited

U.S. PATENT DOCUMENTS

| | | | |
|---|---|---|---|
| 10,059,161 B1* | 8/2018 | Salter ...................... | B60D 1/64 |
| 2009/0122571 A1* | 5/2009 | Simmons ............. | B60Q 1/0023 |
| | | | 362/546 |
| 2014/0062179 A1* | 3/2014 | Torell ..................... | B60R 16/03 |
| | | | 307/9.1 |
| 2014/0180486 A1* | 6/2014 | Newman, Jr. ........... | G06F 1/325 |
| | | | 700/295 |
| 2015/0189724 A1* | 7/2015 | Karc .................. | H05B 37/0272 |
| | | | 315/149 |
| 2015/0249337 A1* | 9/2015 | Raneri .................... | H02J 3/005 |
| | | | 307/24 |
| 2018/0062871 A1* | 3/2018 | Jones .................. | H04L 12/2816 |

* cited by examiner

*Primary Examiner* — Albert K Wong
(74) *Attorney, Agent, or Firm* — Georgiy L. Khayet (57) ABSTRACT

The current invention is a Hitch Switch trailer accessory (switch adapter cap). It is a trailer/camper electrical connection adapter/cap with luminescent features that can be used to switch/power on and off the marker lights on the trailer/camper. The switch adapter cap attaches to electrical pin or blade connectors on standard trailers and campers. It fits over the male connector attached to the trailer/camper. The switch adapter cap has internal components that make connection with the pins or blades on the trailer/camper connector. The switch adapter cap has a novel light-up feature (either around the switch or the switch itself) that enables the switch adapter cap to be visible in low-light settings. The cap will have a wireless communication means that can connect to a computer application on a computing device.

20 Claims, 13 Drawing Sheets

HITCH SWITCH ADAPTER CAP WITH WIRELESS CAPABILITIES

CROSS-REFERENCES TO RELATED APPLICATIONS (IF ANY)

None.

BACKGROUND

1. Field of the Invention

This invention relates to switch adapter cap and particularly one that illuminates the hitch area.

2. Description of Prior Art

In today's world, many people are pulling trailers with their cars or other vehicles. There are a number of switch adapters but they are limited in their usage and functionality. There is still room for improvement in the art.

SUMMARY OF INVENTION

The current invention is a Hitch Switch trailer accessory (switch adapter cap). It is a trailer/camper electrical connection adapter/cap with luminescent features that can be used to switch/power on and off the marker lights on the trailer/camper.

The switch adapter cap attaches to electrical pin or blade connectors on standard trailers and campers. It fits over the male connector attached to the trailer/camper. The switch adapter cap has internal components that make connection with the pins or blades on the trailer/camper connector.

The switch adapter cap has a novel light-up feature (either around the switch or the switch itself) that enables the switch adapter cap to be visible in low-light settings. The switch adapter cap uses electricity drawn from the trailer/camper's internal battery or powered by its own battery—either disposable or rechargeable—that fits inside the switch adapter cap itself.

The switch may also be Bluetooth-enabled (or some other wireless communications/transmission technology), which is engineered into the switch adapter cap. The user installs a dedicated application to their mobile device. The user then pairs their mobile device with the Bluetooth within the switch adapter cap.

The dedicated application can have profiled recommendations based on the user and their preferences. The app will have a profile set up pages for the user to set their preferences. The application will have GPS means and will make recommendations to the user based on their preferences, interests and location as well as a commerce function.

BRIEF DESCRIPTION OF THE DRAWINGS

Without restricting the full scope of this invention, the preferred form of this invention is illustrated in the following drawings.

DESCRIPTION OF THE PREFERRED EMBODIMENT

There are a number of significant design features and improvements incorporated within the invention.

The current invention is a Hitch Switch trailer accessory (switch adapter cap 1). It is a trailer/camper electrical connection adapter/cap 20 with luminescent features that can be used to switch 25 on and off the power of the marker lights 40 on the trailer/camper.

The switch adapter cap 20 fits over the male connector 30, which is attached to the trailer/camper. The female switch adapter cap 20 has electrical pins or blades 10 that make connection with the internal components 15 on the male trailer/camper connector 30.

The switch adapter cap has a novel light-up feature 40 (either around the switch or the switch itself) that enables the switch adapter cap to be visible in low-light settings. The switch adapter cap 20 uses electricity drawn from the trailer/camper's internal battery or powered by its own battery 50—either disposable or rechargeable—that fits inside the switch adapter cap 20 itself.

In the preferred embodiment, Pressing/flipping the switch 25 on the switch adapter cap 20 will illuminate the trailer's marker lights. This may also turn off the light-up feature on the switch adapter cap 20. This may also change the color of the light on the switch adapter cap to indicate that the marker lights are on.

The Pressing/flipping the switch 25 on the switch adapter cap 20 again turns the marker lights off (the opposite procedure above). This may also turn on the light-up feature on the switch adapter cap 20. This may also change the color of the light on the switch adapter cap to indicate that the marker lights are off The switch 25 can be a toggle switch, a push-button, or other suitable mechanism with "on/off" settings. In the event the marker lights on the trailer/camper are dimmable, the switch would allow for more than two settings (for example but not limited to: instead of being a push button, it may be a dial that the user can turn, or a slider that can be moved up or down, in order to illuminate or dim the trailer/camper's marker lights)

In one embodiment, the switch can be Bluetooth-enabled (or some other wireless communications/transmission technology), which is engineered into the switch adapter cap.

The user can install a dedicated app to their mobile device 200. The user then pairs their mobile device with the Bluetooth 60 within the switch adapter cap. The user is then able to open the dedicated app on their mobile device and use it to turn the marker lights on, off, or dimmed through the app's GUI.

Figure 1:
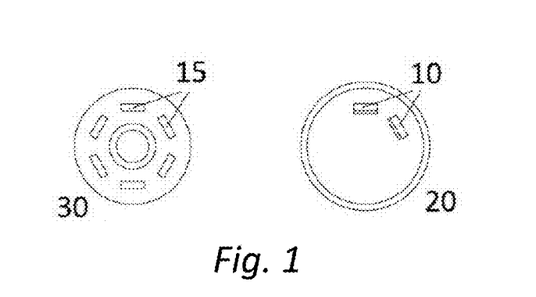
FIG. 1 shows the switch adapter's pin.

In FIG. 1, on the left is the end of the connector 30 that attaches to the trailer, showing its internal components 15.

On the right is the interior of the switch cap 20 that fits over the connector 30, showing its connection pins/blades 10.

Figure 2:
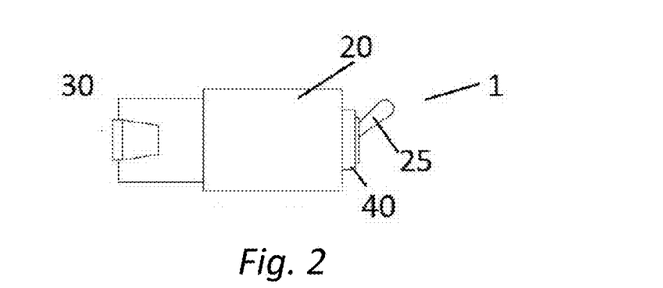
FIG. 2 shows a side view of one embodiment of the switch adapter.
Figure 3:
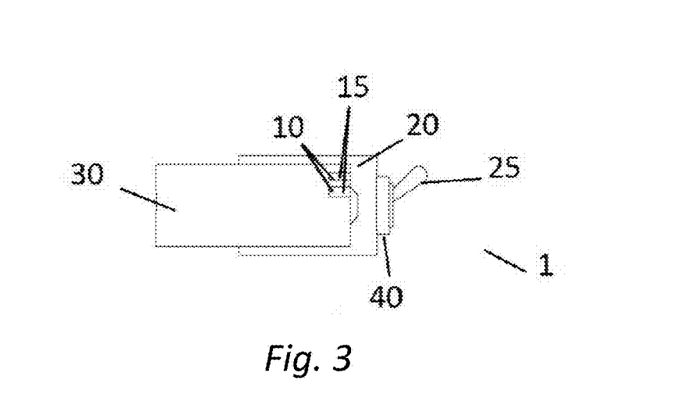
FIG. 3 is a cross-cut view of the switch adapter.
Figure 4:
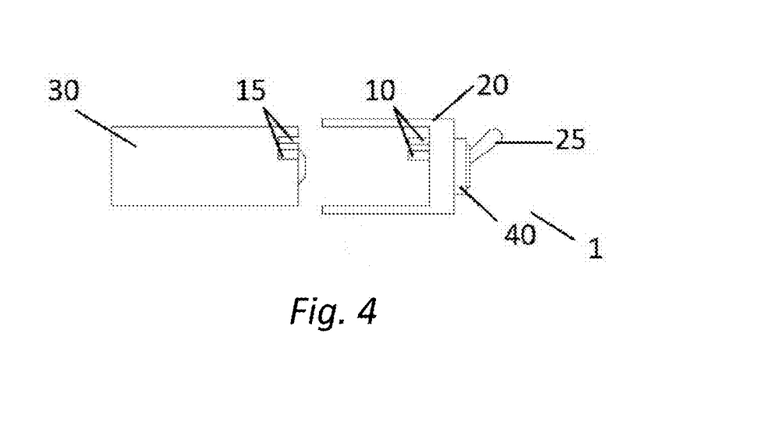
FIG. 4 is an exploded view of the switch adapter.

FIG. 2 displays a sideview of the switch cap fit 20 over the connector 30. FIG. 3 shows a cutaway sideview of the switch cap 20 fit over the connector 30, showing the connection between the connection pins/blades 10 and internal components 15. FIG. 4 shows an exploded cutaway sideview of the switch cap 20 disconnected from the connector 30 also showing the connection between the connection pins/blades 10 and internal components 15.

Figure 5:
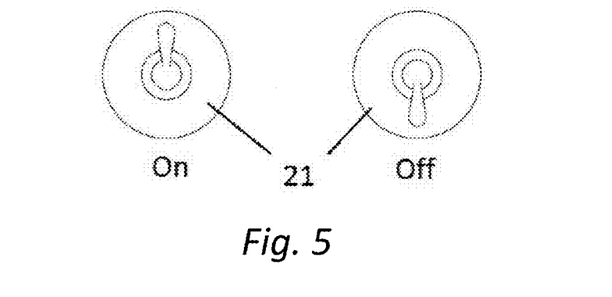
FIG. 5 shows a flip switch.
Figure 6:
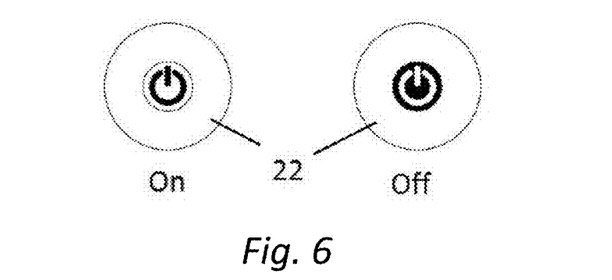
FIG. 6 shows a push button switch.
Figure 7:
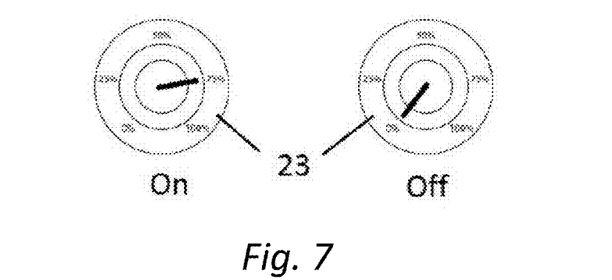
FIG. 7 shows a dimmer dial switch.

The switch cap 1 can have a number of different switch types which are located on a switch end 20. FIG. 5 shows a manual dual-setting flip switch 21, in both On and Off position. FIG. 6 shows a push button switch 22, in both On and Off position where the "Off" position causes the light-up element to illuminate. FIG. 7 shows the dimmer dial 23, in both On and Off position where dimmable marker lights can be adjusted in various degrees—for example, 0% (off), 25%, 50%, 75%, and 100%.

Figure 8:
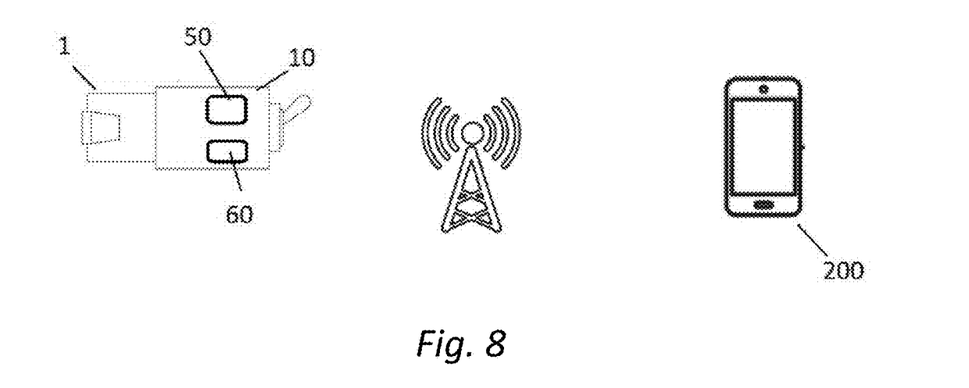
FIG. 8 shows the wireless connection to a computing device.

As shown in FIG. 8, in an embodiment with the Bluetooth-enabled version, the switch cap 20 can link to a computer application (app) that is set to run on a computing device 200 such as a smart phone, tablet or computer. A computing device 200, such as a cell phone, that can access the system 1 must have some version of a CPU, CPU memory, local hard disk, keyboard/keypad/input and display unit. The system, data and processing code can reside in the non-transitory memory of the one or more computing devices. The system 1 in the preferred embodiment would be written to act like a smart phone application (app).

Figure 9:
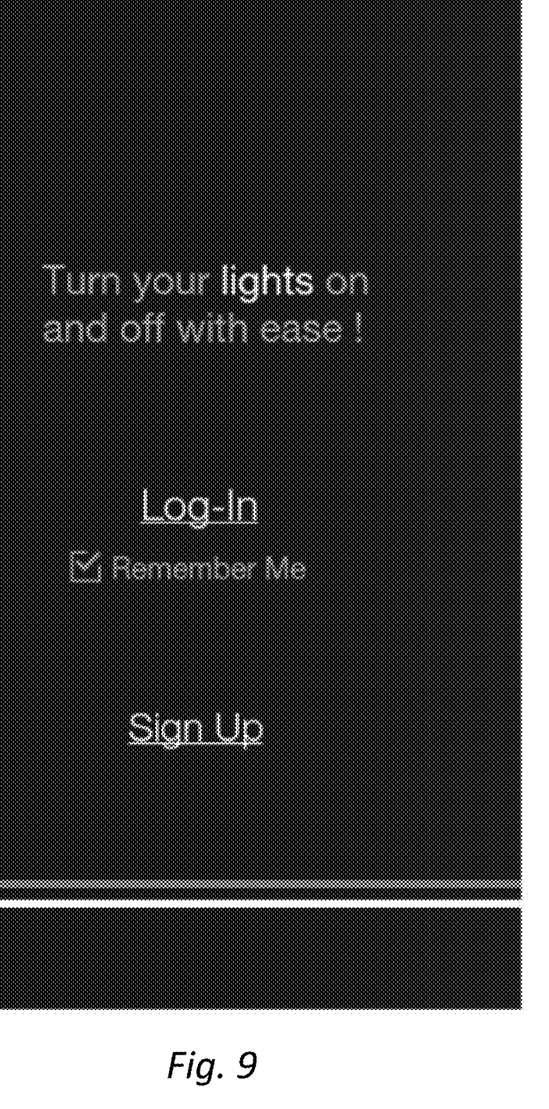
FIG. 9 shows a log in screen.

As shown in FIG. 9, the app could have a Homescreen with a "Log-In."

Figure 10:
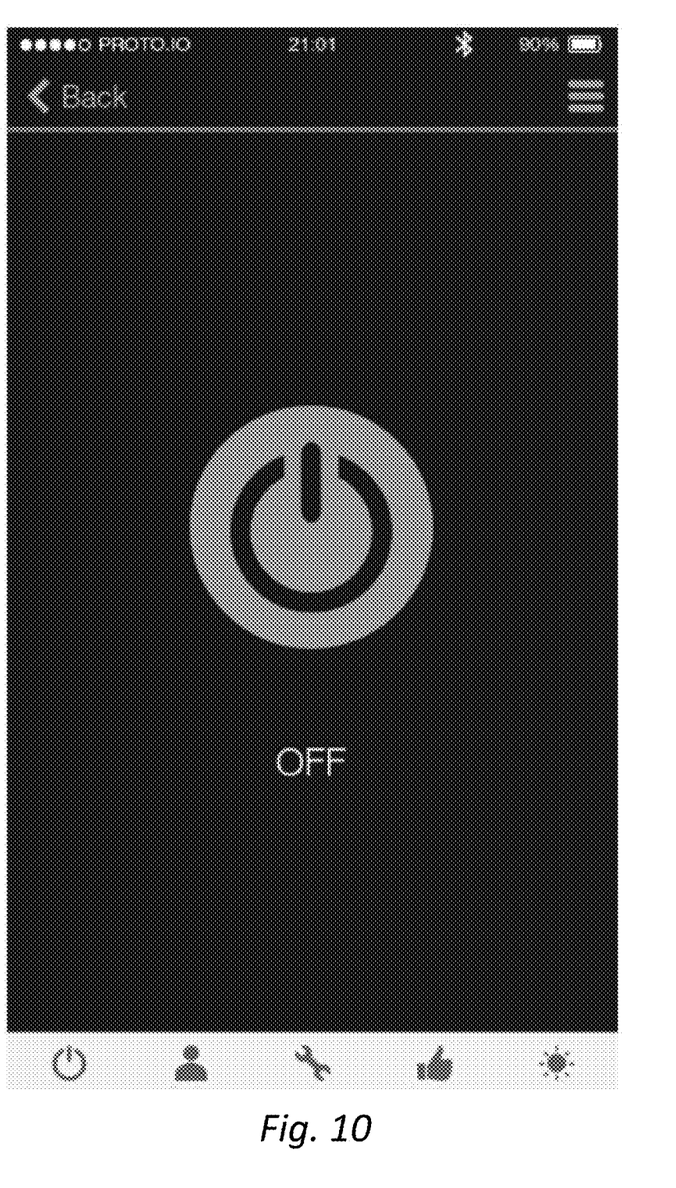
FIG. 10 displays a sample screen and push button function.

As shown in FIG. 10, the app could have a "Push" function where a user would use a tap button to turn light on/tap again to turn light off.

Figure 11:
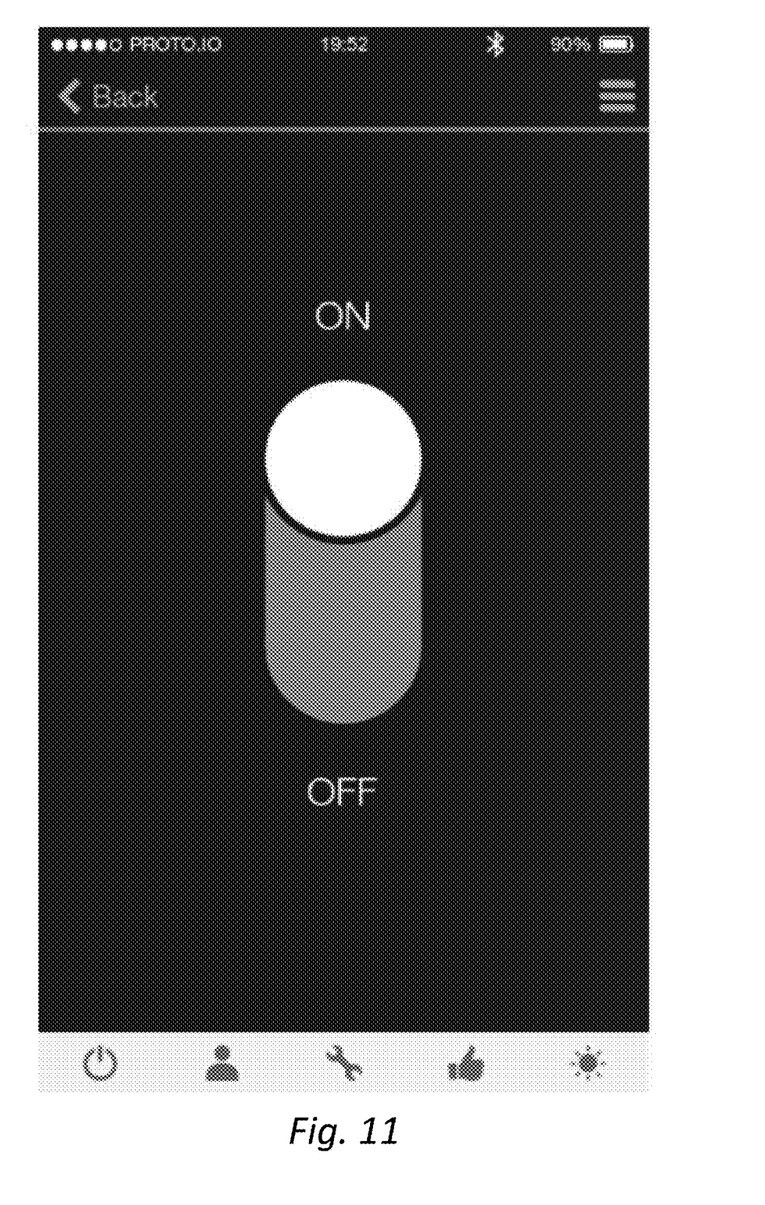
FIG. 11 shows a slider bar function.

The app system could have a "Dual Slider" function (with two modes: On and Off), as shown in FIG. 11 where the user would tap the top of the switch to turn light on and tap the bottom of the switch to turn light off. The user may also slide the button up to the On position or slide it down to the Off position.

Figure 12:
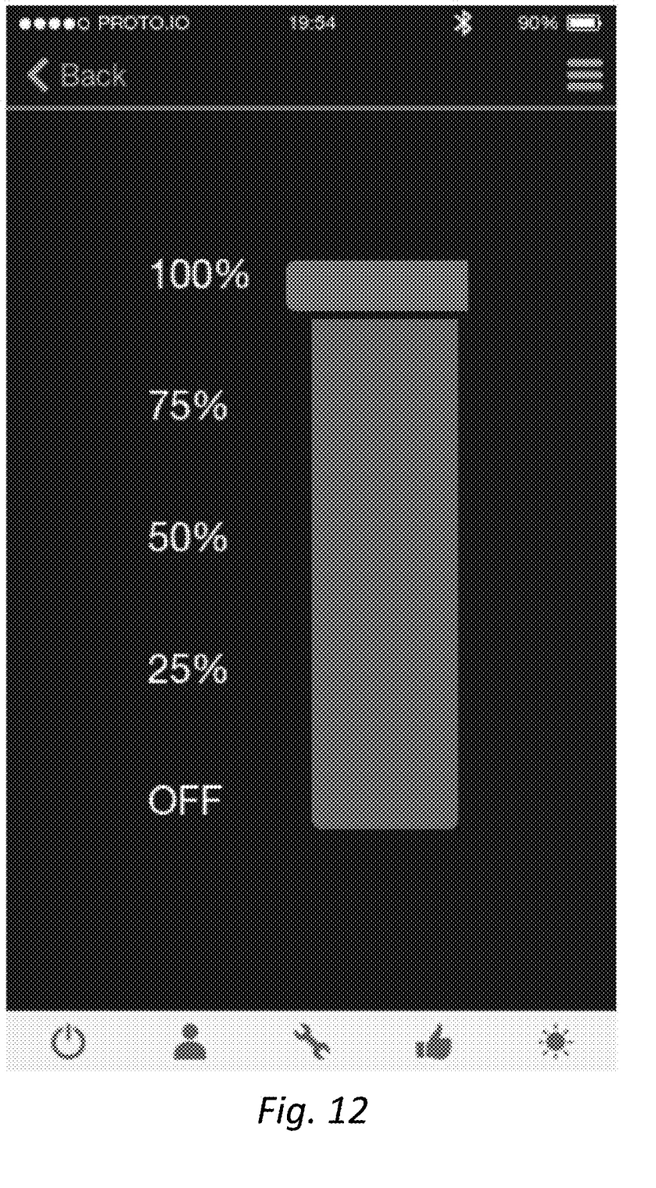
FIG. 12 shows a dimmer slider function.
Figure 13:
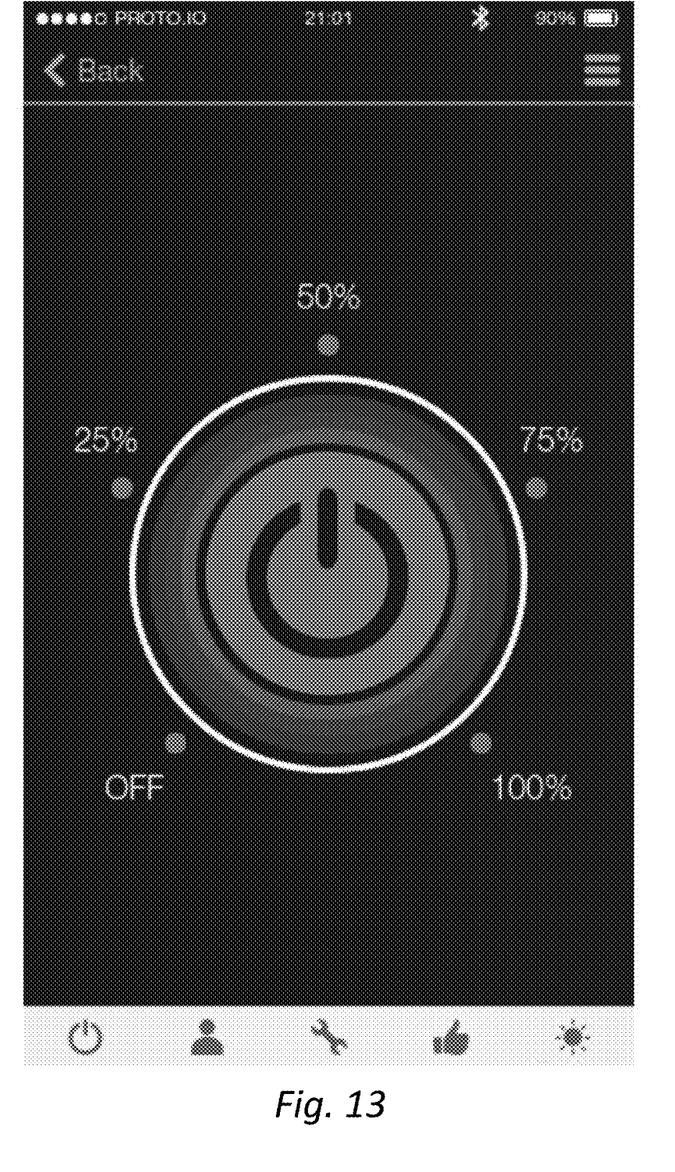
FIG. 13 shows a dial function.

In the event the marker lights are dimmable, the application could have an electronic dimmer slider as shown in FIG. 12 where the user would slide a bar on the screen down to 75%, 50%, 25%, off—and back up again to get the desired brightness. As shown in FIG. 13, this function can also be set up as a dial.

The application would have a GPS function that would identify the location of the user.

Figure 14:
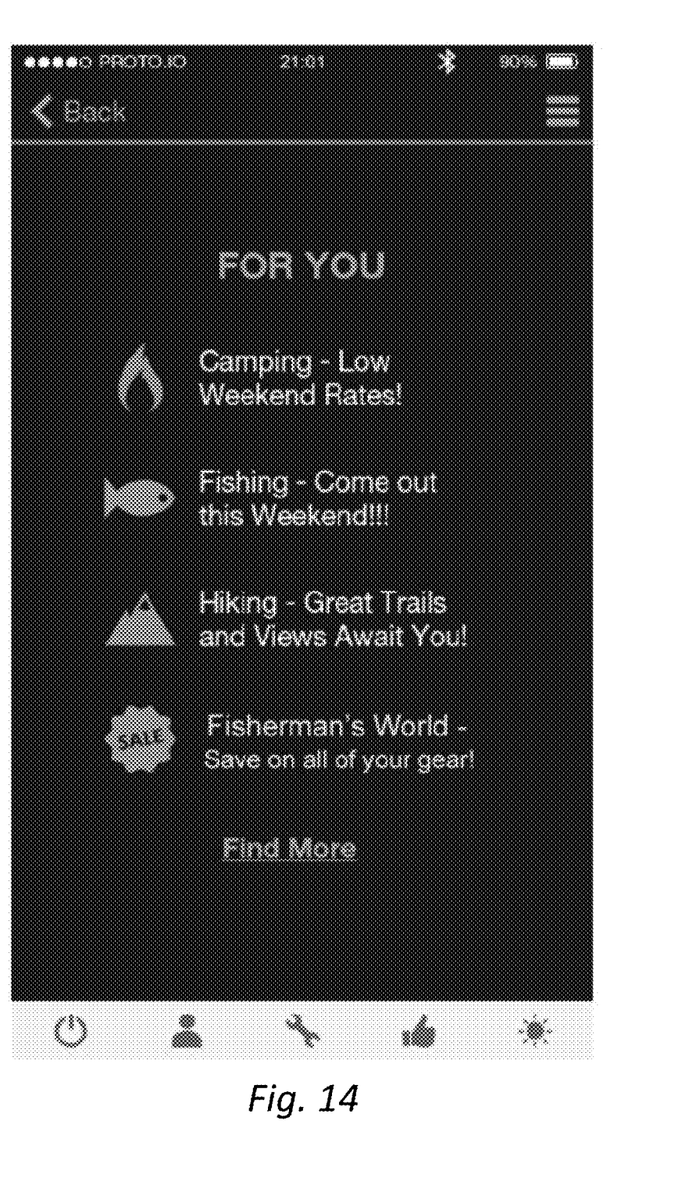
FIG. 14 shows a recommendations screen.

The application can also show recommendations to the user, based upon: their location and their profiled interests and hobbies such as camping, fishing, hiking and outdoor world as shown in FIG. 14. For example, for camping, the user taps "Camping" to advance to the Camping Recommendation screen. There they can tap "Call" to make a phone call to the campgrounds. They can tap "Directions" to pull up the directions to the campgrounds. The user can tap "Back" at the bottom of the Camping Recommendation screen to return to the General Recommendation screen.

Figure 15:
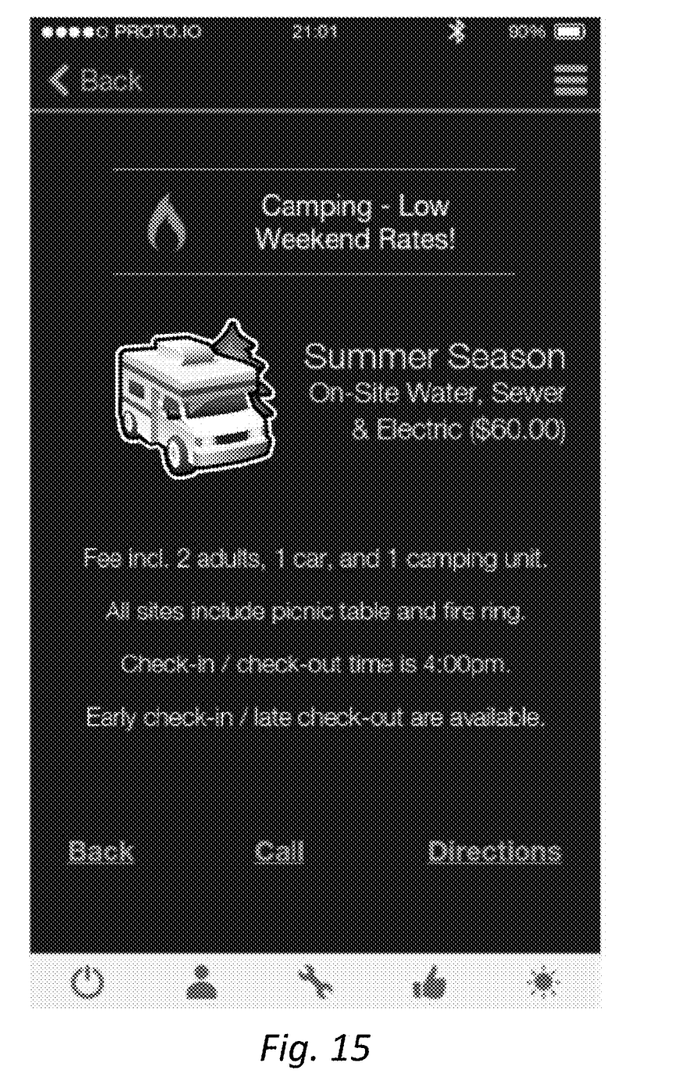
FIG. 15 shows a recommendation screen for camping.

The interests can be set by the user in a user profile which contains user data, e.g. their location and their profiled Hobbies & Interests as shown in FIG. 15.

Figure 16:
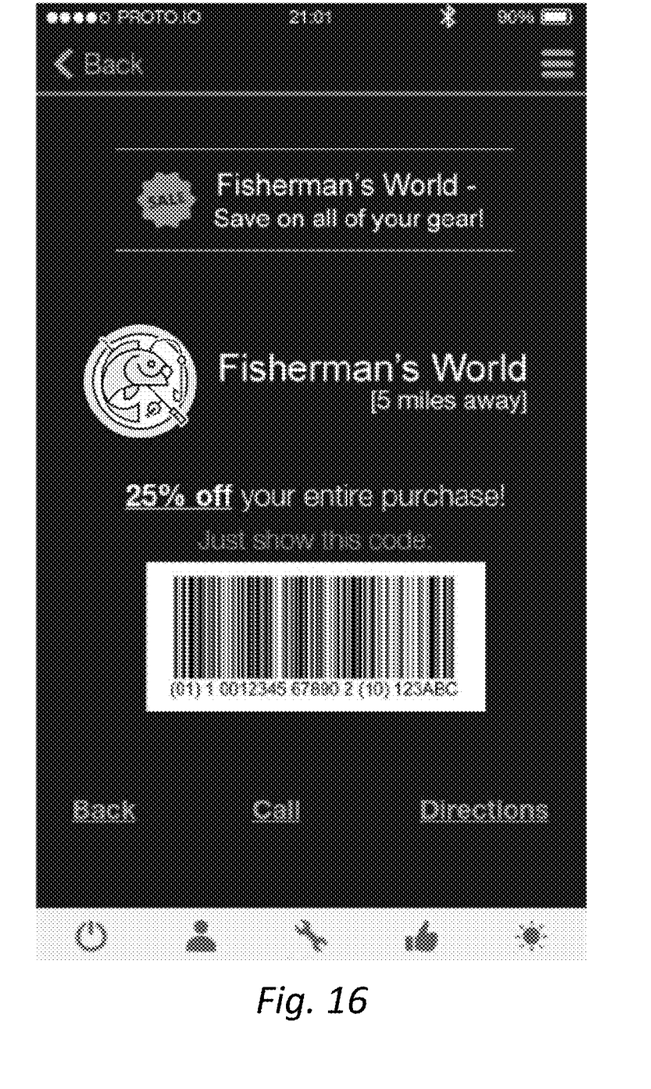
FIG. 16 shows a recommendation screen for retail.
Figure 17:
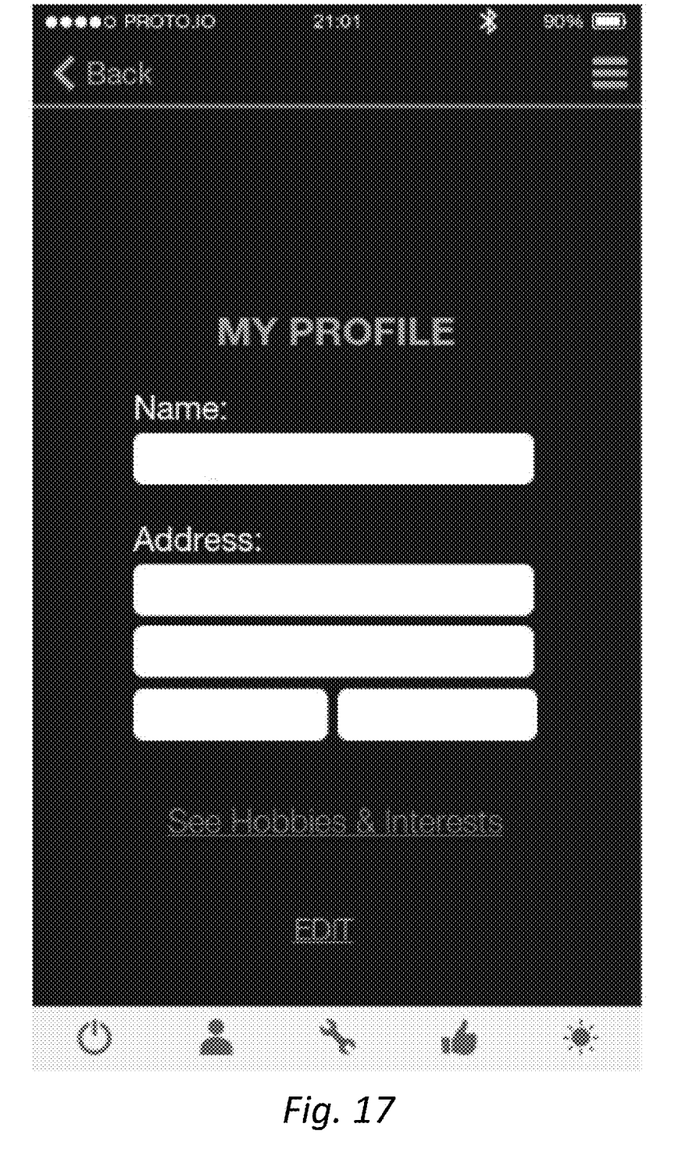
FIG. 17 shows a sample profile screen.
Figure 18:
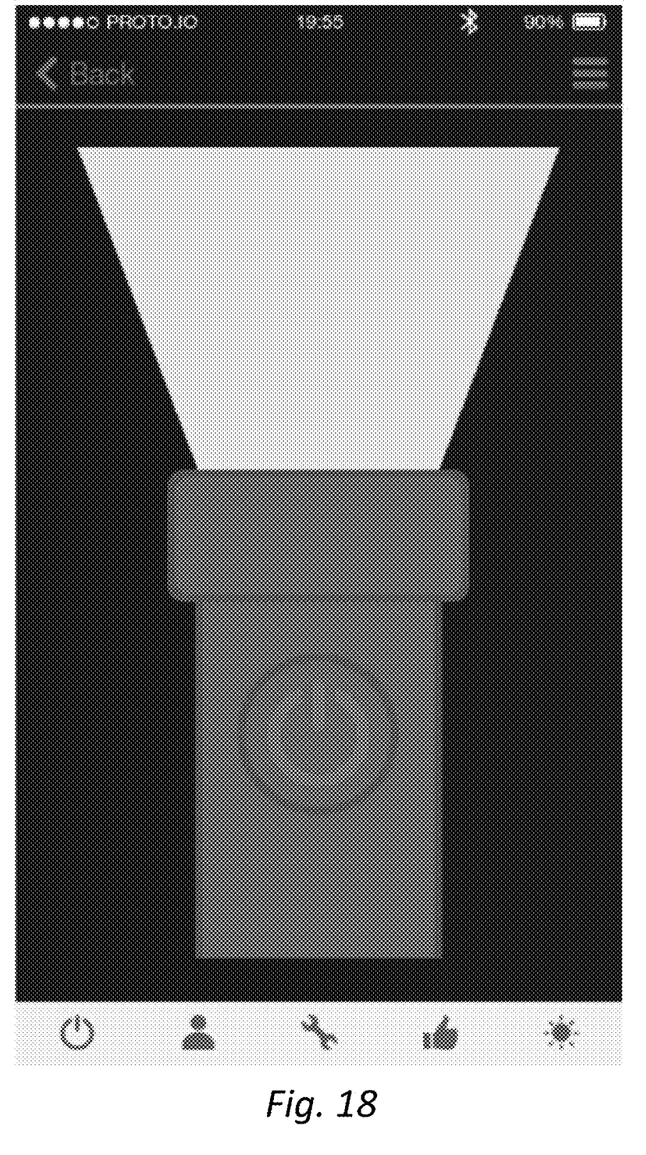
FIG. 18 shows the flashlight function.

The application could have a Settings tab, which provides access to the user's settings. This includes the ability to deactivate and activate the application's Bluetooth connection The application could have a tab on the bottom bar for Flashlight, which provides quick access to the "flashlight" on the user's mobile device where the flashlight function is tabbed on and off as shown in FIG. 16.

As shown in FIGS. 9-18, the screens of the app could have a tap "Back" function (upper left) to return to prior screen and a tap hamburger icon (upper right) to access the settings.

Although the present invention has been described in considerable detail with reference to certain preferred versions thereof, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided. With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

That which is claimed is:

1. A switch adapter cap comprising:
   electrical blades that make connection to internal components of a connector of a trailer;
   a lighting unit;
   a switch configured to switch on and switch off marker lights of the trailer and the lighting unit of the switch adapter cap,
   wherein the switching on causes a change in a color of the lighting unit from a first color to a second color, and wherein the switching off causes a change in the color of the lighting unit from the second color to the first color; and
   a wireless communication module in communication with the switch, the wireless communication module being configured to provide a wireless communication between the switch and a computing device.

2. The device according to claim 1, further comprising a power source fitted inside the switch adapter cap, wherein the lighting unit is powered from one of the power source of the switch adapter cap and a power source of the trailer.

3. The device according to claim 1, wherein
   the wireless communication module is a Bluetooth wireless communication module.

4. The device according to claim 1, wherein
   the wireless communication module is configured to connect to a computer application running on the computing device.

5. The device according to claim 4, wherein
   the computing device is a smart phone.

6. A process comprising:
   providing a switch adapter cap, wherein the switch adapter cap comprises:
   electrical blades that make connection to internal components of a connector of a trailer;
   a lighting unit;

a switch configured to switch on and switch off marker lights of the trailer and the lighting unit of the switch adapter cap; and a wireless communication module in communication with the switch, the wireless communication module being configured to provide a wireless communication between the switch and a computing device;

providing a computer application stored in a non-transitory memory of the computing device;

activating, using the computing device, the wireless communication between the computing device and the switch; and upon the activating, controlling, via the computing device, an operation of the marker lights of the trailer and an operation of the lighting unit of the switch adapter cap by sending commands to the switch, wherein the switching on of the marker lights by the switch initiates changing a color of light of the lighting unit from a first color to a second color, and wherein the switching off of the marker lights by the switch initiates changing the color of light of the lighting unit from the second color to the first color.

7. The process according to claim 6, further comprising: providing a user profile in the computer application.

8. The process according to claim 7, further comprising: determining, via the computer application, a location of the computing device using a GPS module of the computing device.

9. The process according to claim 8, further comprising: making, by using the computer application, recommendations based on the location.

10. The process according to claim 9, wherein the recommendations are provided for one or more of a set of attractions, businesses, or events.

11. The process according to claim 6, wherein the computer application has a commerce function.

12. The process according to claim 6, wherein the computing device is one of a set of smart phones, laptops, computers, or tablets.

13. The process according to claim 6, wherein the computer application have a flashlight function.

14. The process according to claim 6, wherein the controlling, via the computing device, the operation of the marker lights is performed using the computer application.

15. The process according to claim 6, wherein the switch further comprises at least one of a push button, a dimmer dial, and a slider bar to control the marker lights.

16. The process according to claim 6, wherein the switch is a flip switch.

17. The process according to claim 14, wherein the computer application has at least one of a push button and a slider bar to control the marker lights.

18. The process according to claim 14, wherein the computer application has a dimmer dial to control the marker lights.

19. The process according to claim 7, further comprising: setting interests in the user profile.

20. The process according to claim 6 further, wherein the computer application has a settings tab.

* * * * *